United States Patent [19]

Roberson

[11] Patent Number: 4,575,111
[45] Date of Patent: Mar. 11, 1986

[54] QUICK HITCH ASSEMBLY

[75] Inventor: William C. Roberson, Murfreesboro, N.C.

[73] Assignee: Franklin Equipment Company, Franklin, Va.

[21] Appl. No.: 561,516

[22] Filed: Dec. 14, 1983

[51] Int. Cl.⁴ .............................................. B60D 1/00
[52] U.S. Cl. ..................................... 280/477; 280/515
[58] Field of Search ......................... 280/477, 478, 515

[56] References Cited

U.S. PATENT DOCUMENTS

| 3,345,082 | 10/1967 | Atkins | 280/477 |
| 3,421,780 | 1/1969 | Rimmey | 280/477 X |
| 3,542,398 | 11/1970 | Melroe | 280/477 |
| 4,015,855 | 4/1977 | Murray | 280/515 X |
| 4,372,573 | 2/1983 | Ihm | 280/477 |

FOREIGN PATENT DOCUMENTS

| 45295 | 5/1927 | Norway | 280/477 |
| 588954 | 6/1977 | Switzerland | 280/477 |

Primary Examiner—John A. Pekar
Attorney, Agent, or Firm—Cushman, Darby & Cushman

[57] ABSTRACT

A towline is mounted on a pulling vehicle and at one end of the towline a hitching member is secured; the towing vehicle includes a bracket for receiving the hitching member and a locking pin for securing the hitching member in a socket of the bracket; with the locking pin removed, the winch can play out the cable to connect the hitching device to an implement to be towed or pull an implement toward the pulling vehicle.

8 Claims, 6 Drawing Figures 4,575,111

QUICK HITCH ASSEMBLY

BACKGROUND AND SUMMARY OF THE INVENTION

The present invention relates to an improved towing device and, more specifically, to a towing device that will enable the towing tractor or vehicle to negotiate rough terrain or steep grades while temporarily being relieved of the weight of the towed implement.

Frequently, in off the road construction, mining and logging operations, the condition of the terrain can often be such that the towing of various implements can be a time-consuming, if not impossible, endeavor for the towing tractor. In the past, it has frequently been necessary to completely unhitch the towed implement to permit the towing tractor to move to negotiable terrain. Such a practice has often required the virtual abandonment of certain heavy equipment until temporary road conditions can be improved to permit safe towing of such implements.

It is, accordingly, an object of the present invention to overcome the foregoing difficulty by providing a hitching assembly for a towing tractor or vehicle which will eliminate the necessity of unhitching a towed implement should rough terrain, steep grades or weather conditions render it difficult for the towing tractor to continue moving while burdened with the implement.

In a preferred embodiment, the present invention provides a bracket which is mounted on a towing vehicle and which includes a socket for receiving a hitching member which is connected to one end of a cable with the other end of the cable being connected to a powered winch which may be either part of the bracket or part of the towing tractor. A locking device in the form of a movable pin is provided to lock the connecting or hitching device in the socket of the bracket for normal towing of an implement. In the event that the towing tractor encounters difficulties, the locking pin is unlocked and the winch operated to play out the cable while the towing vehicle continues movement until negotiable terrain is reached. Thereafter, the winch is operated to pull the implement to the towing vehicle until the hitching member is securely inserted into the socket and locked in position by the locking pin.

With this arrangement, delays that have normally been encountered where a towing vehicle encountered a steep grade, mud or obstacles such as tree stumps can be greatly minimized if not entirely eliminated and the dangers of towing cumbersome implements over such terrain will be greatly diminished. In addition, the socket of the bracket and the hitching member are designed so that the driver of the towing vehicle can remain at the controls of the towing tractor during operation of the winch towing of the implement.

The foregoing and other advantages will become apparent as consideration is given to the following detailed description taken in conjunction with the accompanying drawings, in which:

DETAILED DESCRIPTION OF THE INVENTION

Figure 1:
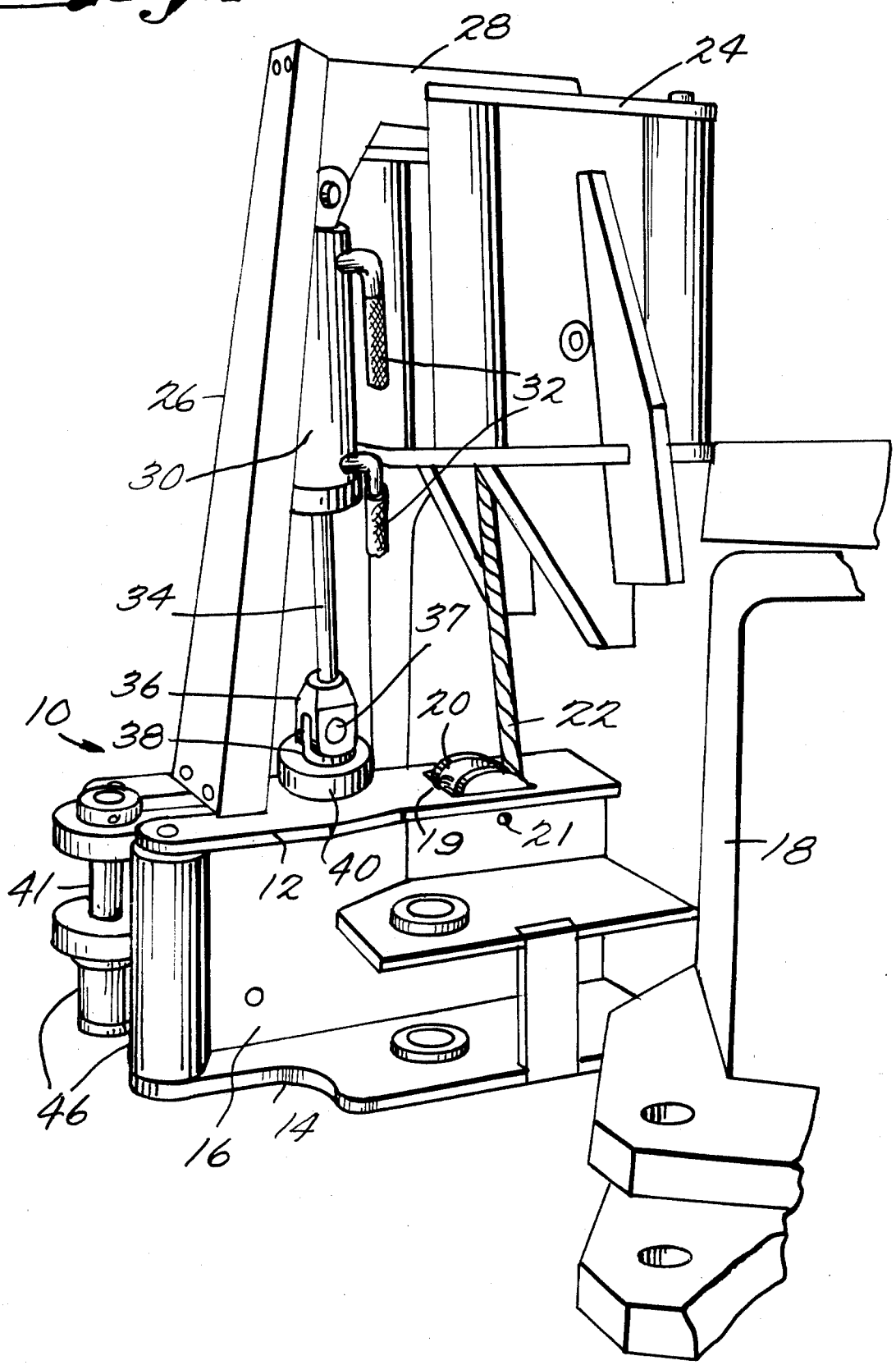
FIG. 1 is a perspective view of the hitching bracket assembly of the present invention.

Referring now to the drawings wherein like numerals designate corresponding parts throughout the several views, there is shown in FIG. 1 the bracket 10 of the present invention which includes, in an exemplary form, two parallel extending plates 12 and 14 which are secured, as by bolting or welding, to extend perpendicularly from a mounting plate 18 which itself is secured to the chassis 17 of a towing vehicle such as a tractor. The plates 12 and 14 are separated by a pair of perpendicularly extending plates one of which is indicated at 16.

The upper plate 12 is provided with an opening 19 through which partially extends a pulley 20 which is rotatably mounted on a pin 21 which extends through openings in the sides of the plates 16. The pulley serves as a guide for a cable 22 which, as shown, extends upwardly to a guide pulley 23 (FIG. 2), rotatably mounted in a housing 24 which also may be suitably mounted on the chassis of the tractor above the bracket 10. From the pulley 23, the cable extends to a winch carried on the tractor and operated by either a take-off from the tractor motor or by the hydraulic system of the vehicle. Adjacent the housing 24 a guard wall 26 is disposed to extend upwardly from the plate 12 and is secured to a mounting arm 28 which may be attached to the top part of the housing 24. The arm 28 pivotably supports a hydraulic cylinder 30 which has the conventional hydraulic lines 32 which may be connected to the hydraulic pump of the towing vehicle. A piston (not shown) is mounted within the cylinder 30 and, as is conventional, a piston rod 34 extends from the lower end of the cylinder and is connected to a yoke 36 having a pin 37 which is inserted through a bore in the uppermost end of a locking pin 38. An annular guide member 40 is disposed about a circular opening in plate 12 to serve as a guide for the pin 38.

Figure 2:
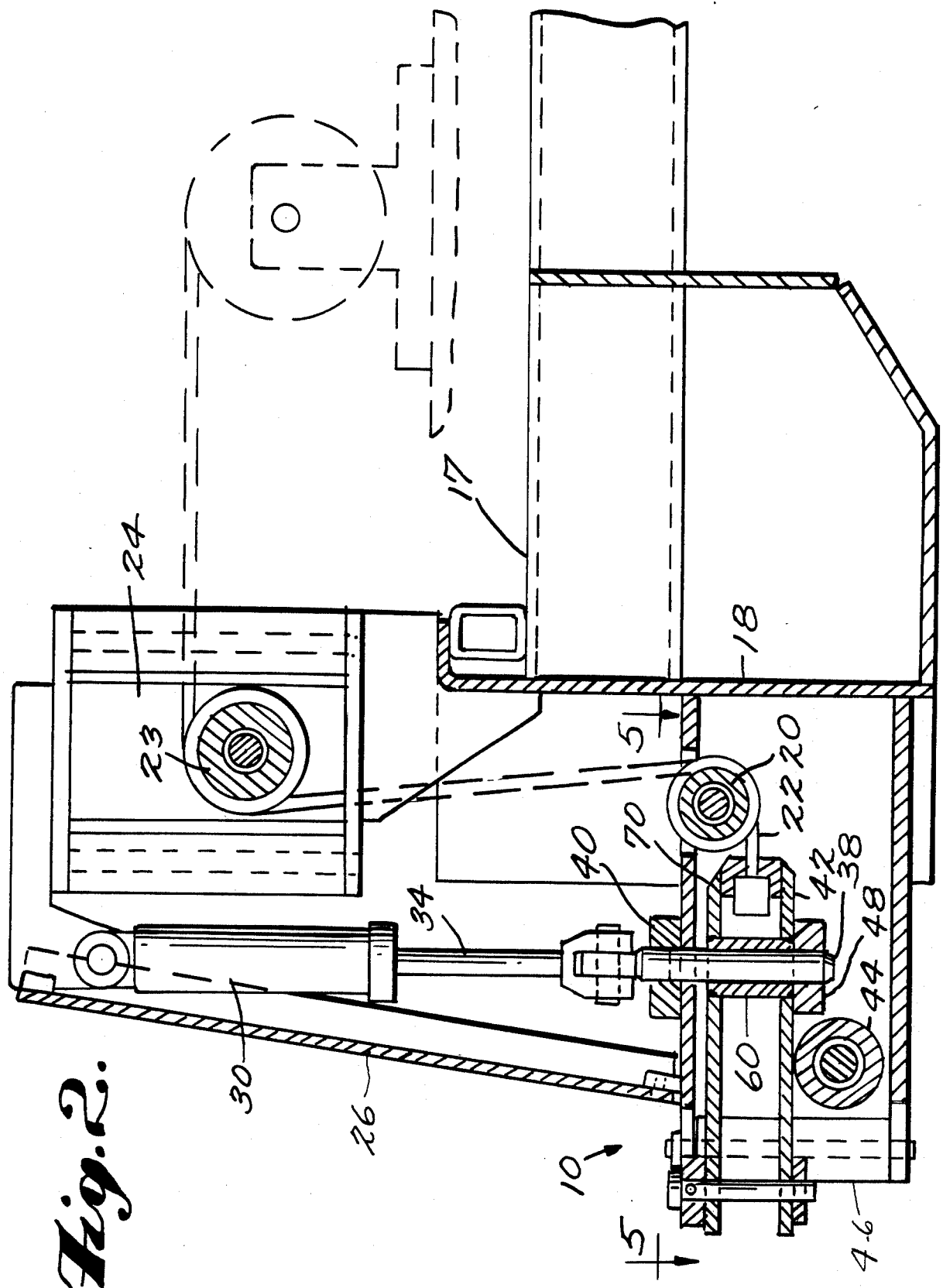
FIG. 2 is a sectional view in elevation of the device of FIG. 1.

Turning now to FIG. 2, there is shown a connecting member or hitching device 42 which, at its forward end, is releasably connected to cable 22.

Figure 5:
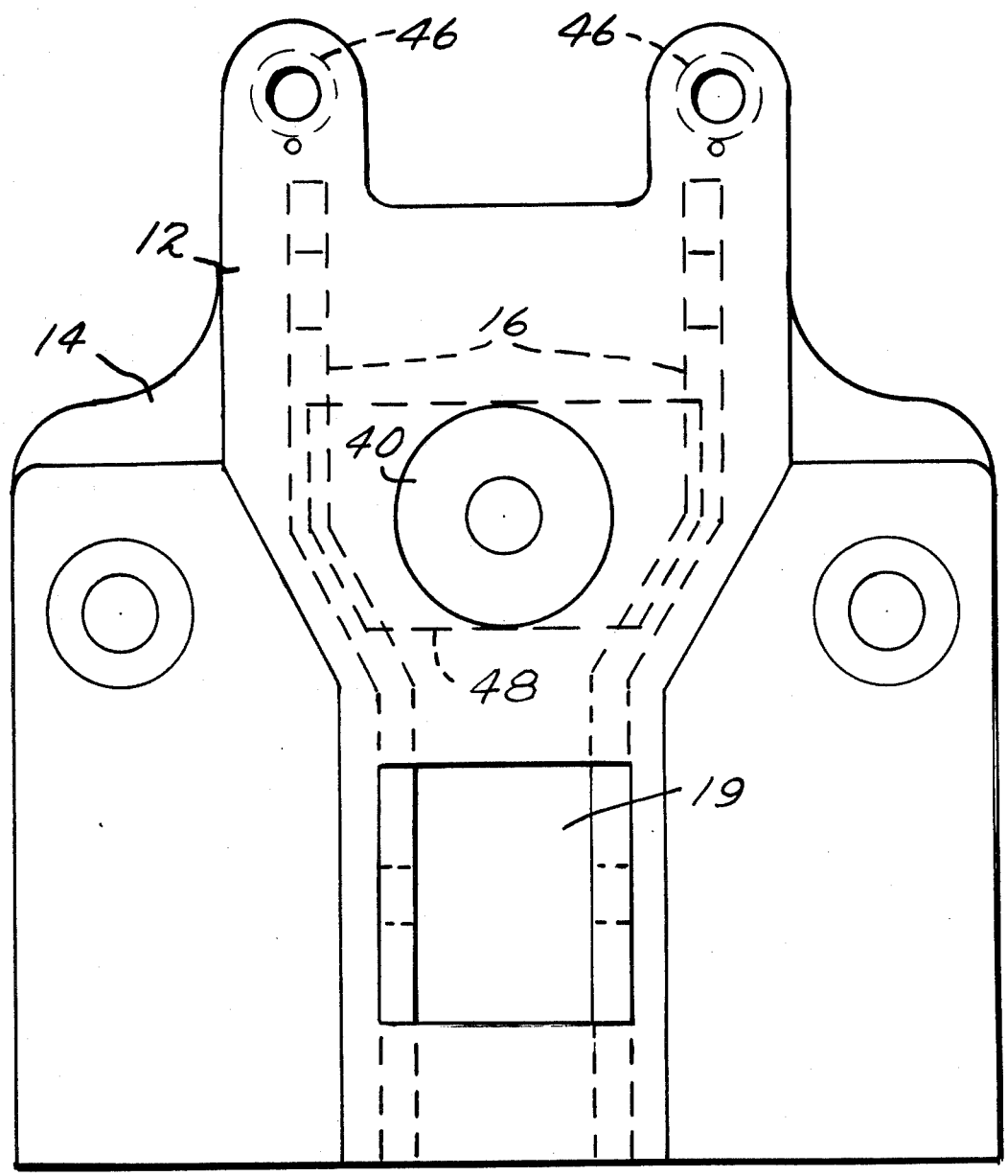
FIG. 5 is a view along lines 5—5 of FIG. 2 with the locking pin and connecting member deleted for clarity.

Between the plates 16, there is rotatably mounted a guide roller 44 which may of resilient material such as rubber. In addition, two guide rollers 46 preferably of steel are rotatably mounted in spaced parallel relation on the outer end of the plates 12 and 14 to define an entrance. A transverse plate 48 having an aperture for receiving the pin 38 extends between plates 16 (FIG. 5) and is disposed at a selected distance between the interior sides of the plates 12 and 14. These elements, the rollers 44 and 46 and the plate 48 together define a socket for the connection member 42 in the bracket 10.

Figure 3:
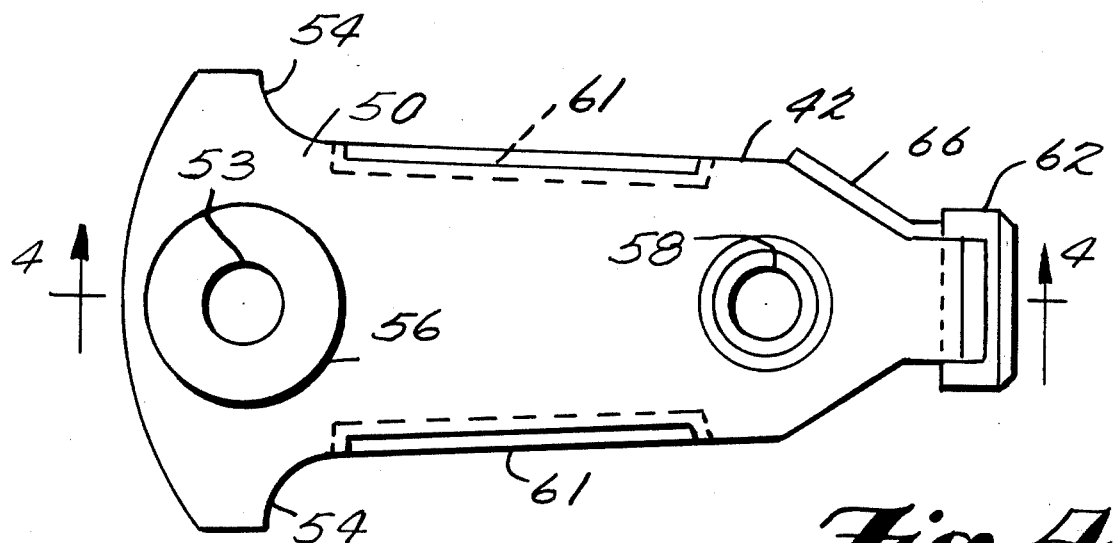
FIG. 3 is a top plan view of the connecting member of the present invention.
Figure 4:
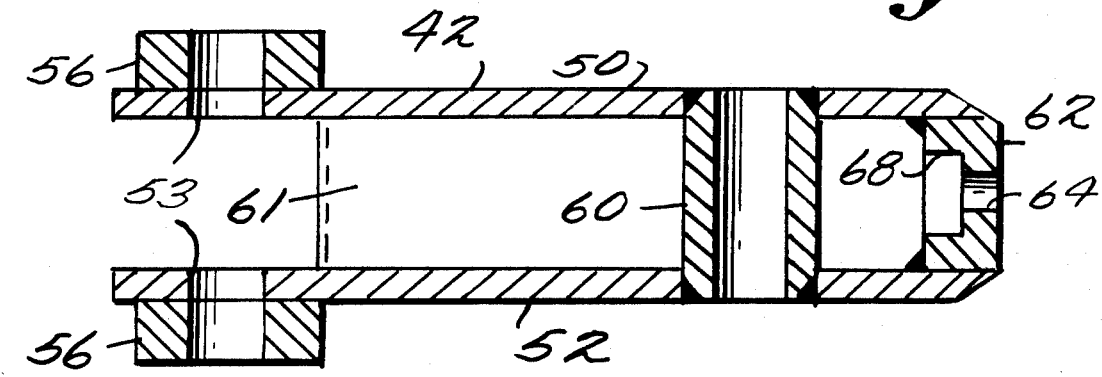
FIG. 4 is a view along lines 4—4 of FIG. 3.
Figure 6:
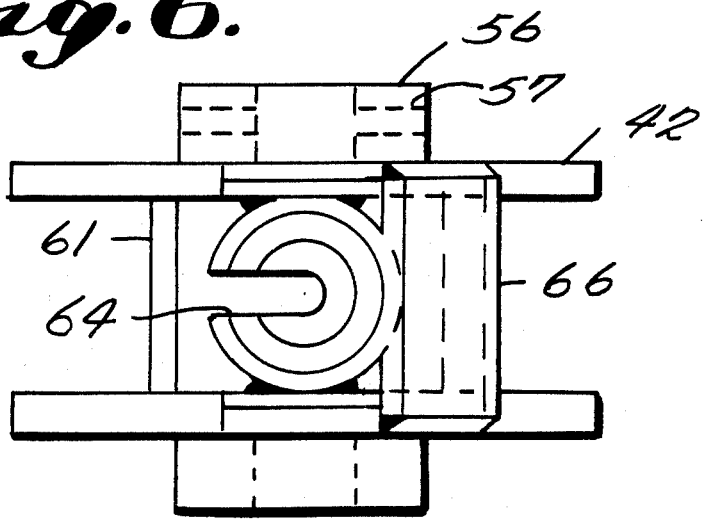
FIG. 6 is a front view in elevation of the connecting member of FIG. 3.

Turning now to FIGS. 3, 4 and 6, there is shown the connection or hitching member 42 which is constructed with upper and lower plates 50 and 52 which extend in parallel relation and are separated by side wall plates 61 to which the plates 50 and 52 are securely fastened as by welding, bolts or rivets. The rear end of the connecting device 42 is provided with a flared end having curved shoulders 54 which engage the rollers 46 when the connection device 42 is located in the socket in the bracket 10 as described above. Spaced inwardly from the rear end of the connection device 42 is a pair of aligned apertures 53. Welded to the respective surfaces 50 and 52 are annular ring members 56 which surround the apertures 53 which are provided for receiving a hitching pin 41 (FIG. 1). The upper ring member 56 may be provided with a bore 57 through its diameter for receiving a pin which will pass through the hitching pin 41 to secure it in place. The distance between the interior surfaces of the plates 50 and 52 should be such that a hitching tongue of an implement may be inserted therebetween for receiving the hitching pin 41. Adjacent the front end of the connection device 42, an aperture 58 is provided which is defined by a cylindrical tube 60 which is welded to the plates 50 and 52, as illustrated in FIG. 4. The interior diameter of the tube 60 is such that the locking pin 38 will fit easily therein as shown in FIG. 2.

At its first end, the connection device 42 is provided with a nose member 62 which includes a slot 64 and a recess 68 for receiving the chock 70 attached to the end of the cable 22. A protective plate 62 is welded to the exterior edges of the plates 50 and 52 to guard against damage to the member 62. The surfaces 54 will be located relative to the aperture 58 such that when the hitching member 42 is in the socket and the surfaces 54 engaging the rollers 46, the tube 60 and associated apertures in the bracket 10 will all be aligned to receive the locking pin 38.

In operation of the hitching assembly of the present invention, a worker will connect an implement to be towed in the normal fashion by securing the hitching tongue of the implement between the plates 50 and 52 with the hitching member 42 in the position illustrated in FIG. 2. The hitching pin 41 will then be inserted and locked in position. In the event the towing tractor encounters difficulty in moving over terrain, the tractor operator simply unlocks the locking pin 38 by retracting the piston rod 34 to release the connection device 42 and then will allow the winch to play out a length of cable as the pulling tractor continues to move to secure ground. Thereafter, the winch is operated while the tractor is stopped to pull the towed implement towards the tractor until the connection device 42 returns to the socket in the bracket 10 and is locked by reinsertion of the locking pin 38 to the position illustrated in FIG. 2. Thereafter, the towing tractor may recommence movement with the implement hitched to the tractor in the normal manner.

Having described the invention, it will be apparent that various modification may be made thereto without departing from the spirit and scope of this invention as defined in the appended claims.

What is claimed is:

1. A hitch assembly for mounting on a towing vehicle including winch means for reeling in and letting out a cable, said assembly comprising bracket means mountable on a towing vehicle, said bracket means including socket means for receiving connecting means, connecting means having at one end a nose portion for connection to an end of the cable and at an end opposite said nose portion hitching means for connection to an implement to be towed, said bracket means further including locking means movable to a locked position for locking said connecting means in said socket means when said connecting means is in said socket means and movable to an unlocked position wherein said connecting means will be movable out of said socket means, said socket means has an entrance opening for said connecting means and said bracket means includes guide means adjacent said entrance means, said guide means comprising a plurality of rotatably mounted rollers, said connecting means have opposite guide edges extending between said ends thereof, said rollers including at least one pair of rollers mounted for rotation about vertical axis and spaced apart a distance such that the periphery of said rollers will engage said opposite guide edges of said connecting means when said connecting means is inserted into said socket means.

2. A hitch assembly for mounting on a towing vehicle including winch means for reeling in and letting out a cable, said assembly comprising bracket means mountable on a towing vehicle, said bracket means including socket means for receiving connecting means, connecting means having at one end a nose portion for connection to an end of the cable and at an end opposite said nose portion hitching means for connection to an implement to be towed, said bracket means further including locking means movable to a locked position for locking said connecting means in said socket means when said connecting means is in said socket means and movable to an unlocked position wherein said connecting means will be movable out of said socket means, said socket means having an entrance opening for said connecting means and said bracket means including guide means adjacent said entrance means, said guide means comprising a plurality of rotatably mounted rollers, said plurality comprising three rollers, a first one of said rollers being rotatably mounted on one side of said entrance opening, a second one of said rollers being rotatably mounted on the other side of said entrance opening with said one and said another rollers being rotatable about vertical axes, the third one of said rollers being rotatably mounted beneath said socket means and spaced inwardly of said entrance opening and being rotatable about a horizontal axis.

3. The invention as claimed in claim 2 wherein said locking means includes a pin and actuation means for moving said pin between said locked and unlocked positions.

4. The invention as claimed in claim 3 wherein said actuation means is a hydraulic piston and cylinder mounted on said bracket means with said pin being connected to said piston so as to be movable therewith.

5. The invention as claimed in claim 3 wherein said socket means includes two vertically spaced apart walls and aligned apertures in said walls for receiving said pin.

6. The invention as claimed in claim 5 wherein said connecting means includes an opening extending therethrough located intermediate said ends and alignable with said aligned apertures in said walls of said socket means when said connecting means is fully inserted in said socket means.

7. The invention as claimed in claim 5 wherein said socket means includes an apertured block for receiving said locking pin when in said locked position.

8. The invention as claimed in claim 2 wherein said bracket means includes a rotatable pulley means for guiding the cable as the cable moves towards and away from said winch means.

* * * * *